(12) United States Patent
Inoue et al.

(10) Patent No.: US 6,372,175 B1
(45) Date of Patent: Apr. 16, 2002

(54) RESIN PELLETS FOR INJECTION MOLDING

(75) Inventors: Kazushige Inoue, Tochigi Prefecture (JP); Cornelis Jan Maria Rijken, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/398,841

(22) Filed: Sep. 17, 1999

(51) Int. Cl.$^7$ .................................................. B32B 5/16
(52) U.S. Cl. ........................................ 264/460; 264/478
(58) Field of Search ................................. 264/478, 460

(56) References Cited

U.S. PATENT DOCUMENTS

| | | | |
|---|---|---|---|
| 4,421,470 A | 12/1983 | Nakamura | |
| 4,701,770 A | * 10/1987 | Ito et al. ................... | 346/135.1 |
| 4,741,689 A | 5/1988 | Onizawa et al. | |
| 5,068,065 A | 11/1991 | Maus et al. | |
| 5,156,860 A | 10/1992 | Kojima et al. | |
| 5,186,959 A | 2/1993 | Tanaka | |
| 5,238,393 A | 8/1993 | Kishi | |
| 5,458,818 A | 10/1995 | Kim et al. | |
| 5,545,710 A | * 8/1996 | Haese et al. ................. | 528/201 |
| 5,607,700 A | 3/1997 | Kando et al. | |
| 5,741,627 A | * 4/1998 | Cubit et al. .................. | 430/321 |
| 5,783,233 A | 7/1998 | Takahashi | |
| 6,066,398 A | 5/2000 | Ueda | |

FOREIGN PATENT DOCUMENTS

| | | |
|---|---|---|
| JP | 62160210 | 7/1987 |
| JP | 10034647 | 2/1998 |
| JP | 11035692 | 2/1999 |
| WO | WO 9939888 A1 | 8/1999 |

OTHER PUBLICATIONS

PCT Written Opinion for International Application No. PCT/US 00/24409.
Anlagenbau in der Kunststofftechnik, F. Hensen, published before Apr. 1998.
Makrolon CD 2005, Bayer AG, Oct. 15, 1997, p. 2.

* cited by examiner

Primary Examiner—Hoa T. Le

(57) ABSTRACT

It has been discovered that the shape of a resin pellet can be controlled to reduce cycle time of an injection molding machine and improve the yield by narrowing variability in the plasticizing time.

6 Claims, 2 Drawing Sheets

W>H

RESIN PELLETS FOR INJECTION MOLDING

CROSS-REFERENCE TO RELATED APPLICATIONS

Not applicable.

FEDERALLY SPONSORED RESEARCH

Not applicable

BACKGROUND OF THE INVENTION

This invention relates to a method for improving injection molding and to pellets for improved injection molding.

One feature of this invention is that it may be used to reduce the plasticizing time of the resin (e.g., polycarbonate or polyestercarbonate), and it may improve the consistency of the plasticizing time. These factors are important for achieving a successful product in short cycle time injection molding operations (e.g., forming optical media such as optical disks).

As stated in U.S. Pat. No. 5,068,065, it is generally desirable in injection molding operations to reduce cycle times to the maximum extent possible. Shorter cycle times lead to higher profit margins because more pieces can be produced in a set period of time.

A typical injection molding machine is shown in FIG. 1. To operate the machine, one adds a plastic resin to the hopper. The resin may be in the form of small resin pellets. The pellets are then fed from the hopper into an extrusion device, which is typically a heated cylinder with a screw inside. The resin pellets are plasticized in the cylinder, and are extruded from an aperture into a mold. The term "plasticize" refers to the process of transforming the solid resin pellets into homogenous melted resin. The plasticizing time is the total time required to melt and homogenize the volume of resin necessary to fill the mold for the next cycle. An example of this apparatus is shown in U.S. Pat. No. 5,156,860. The molten resin cools in the mold, and the mold is subsequently opened. If the mold is opened too quickly (i.e., before cooling is complete), the part will be ruined. The plasticizing time must be shorter than the cooling time to ensure that the machine will be ready to refill the mold as soon as the previous part is removed. This is especially important for molding machines which are not equipped with a shut off nozzle because the nozzle can drool if the plasticizing time is too long. Moreover, erroneous plasticizing times may cause defective parts. This problem limits the minimum cycle time.

In the past, it was not recognized that the pellet size would have a significant impact on the plasticizing time because the pellets are melted before the resin is injected into the mold.

Commercially available resin pellets for injection molding generally are roughly cylindrical shaped, and have an average height to width ratio of 0.81 or less.

It would be desirable to modify resin pellets to decrease the cycle time to the extent possible, by making the plasticizing time shorter and more uniform.

BRIEF SUMMARY OF THE INVENTION

It has been discovered that the shape of resin pellets fed into an injection molding machine affects the plasticizing time of the molded article. Specifically, it has been discovered that certain pellet shapes can reduce plasticizing time and improve the yield of an injection molding process by narrowing variability in the plasticizing time.

It has further been discovered that both the total plasticizing time and the variability of plasticizing time in an injection molding machine can be reduced by using resin pellets that have a height to width ratio of between 0.82 and 1.

It has also been discovered that maintaining this ratio is very helpful in reducing cycle time for optical disk molding operations.

It has additionally been discovered that using polycarbonate and/or polyester carbonate pellets having a height to width ratio of between 0.82 and 1 will improve the cycle time and variability in optical disk injection molding operations.

DETAILED DESCRIPTION OF THE INVENTION

The present invention may be understood more readily by reference to the following detailed description of a preferred embodiment of the invention and examples. However, it should be understood that the invention is not limited to any particular embodiment described herein by way of example.

In this specification and in the claims, which follow, reference will be made to a number of terms, which will be defined to have the following meaning.

The term "polycarbonate" as used herein includes copolycarbonates, homopolycarbonates and (co) polyestercarbonates.

The term "plasticizing time" as used herein means the total time required to melt and homogenize the volume of material necessary to fill the mold.

The term "cooling time" as used herein refers to the time between when the mold is filled, and the mold is opened.

The term "pellet" refers to a small unit of plastic typically sold in bulk by resin manufacturers. Pellets are typically formed by melt extruding a plastic flake material. The melt extruder typically extrudes circular cross-section strands of molten resin, which are cooled and cut to form pellets having a roughly cylindrical shape.

The term "width" refers to the widest diameter of a roughly cylindrical shaped resin pellet.

The term "height" refers to the smallest diameter of a roughly cylindrical shaped resin pellet.

Throughout this application, where publications or patents are referenced, the disclosures of these publications or patents are hereby incorporated by reference into this application.

An improved method has been discovered for injection molding. Specifically, it has been found that the plasticizing time can be reduced and made less variable by controlling the height to width ratio of pellets introduced into an injection molding machine. Specifically, the average plasticizing time can be reduced by making the height to width ratio of the pellets greater than 0.82, more preferably greater than 0.9, and ideally, as close as possible to 1.

Figure 3:
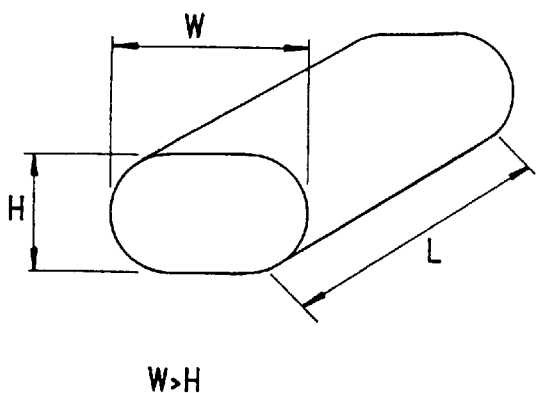
FIG. 3 is view of a pellet according to the invention.

Thermoplastic resins are typically pelletized after synthesis before they are sold. The pelletization process typically involves heating the resin to its melting point, optionally adding various additives (e.g., dyes, pigments, stabilizers, rubbery impact modifiers, plasticizers, flame retardants, drip retardants and other conventional thermoplastic additives or fillers), extruding the resin in circular strands, and cutting the strands at a predetermined interval. U.S. Pat. No. 5,607,700, 4,421,470 and 5,186,959 all describe various pelletizing machines for performing this process. In the examples that follow, a Shear Automatik US 1000 pelletizing machine is used. This is a commercially available pelletizing machine which uses a rotating cam such as that shown in U.S. Pat. No. 4,421,470. Whichever pelletizing machine is used, it must be adjusted such that the height to width ratio of the pellet, as shown in FIG. 3, is greater than 0.82. The height to width ratio may be adjusted to ensure that it is greater than 0.82 by adjusting the speed of the cutting wheel in a pelletizer such as that described in U.S. Pat. No. 5,186,959. Alternatively, one can also adjust the profile of the extruded strands by making the die apertures (e.g., FIG. 4 of U.S. Pat. No. 4,421,470) more circular. It may also prove useful to adjust the water temperature if the strands are extruded into a water bath before they are cut into pellets. Typically, the water bath should be kept above room temperature.

A variety of different resins are suitable for injection molding operations and for pelletizing as described herein. A non-limiting list of such resins includes polyvinyl chloride, polyolefins, polyesters, polyamides, polysulfones, polyether imides, polyether sulfones, polyphenylene sulfides, polyether ketones, polyether ether ketones, ABS resins, polystyrenes and polystyrene copolymers, polybutadiene, polyacrylates and polyacrylate copolymers, polyacrylnitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride. polyvinylidene fluoride, polyvinylidene chloride, teflons, and blends, copolymers, mixtures and composites thereof. Preferred resins include polycarbonates and polyestercarbonates.

Typical pellets made according to the invention have a length of from 2 to 3.5 mm. It is most preferred, for purposes of the invention that the pellets have a length of from 2.7 to 3.3 mm, and a width of from 2.9 to 3.5 mm, and a height of from 2.3 to 2.9 mm. As mentioned above, within these limitations, the height to width ratio must be greater than 0.82, and preferably greater than 0.90.

Figure 1:
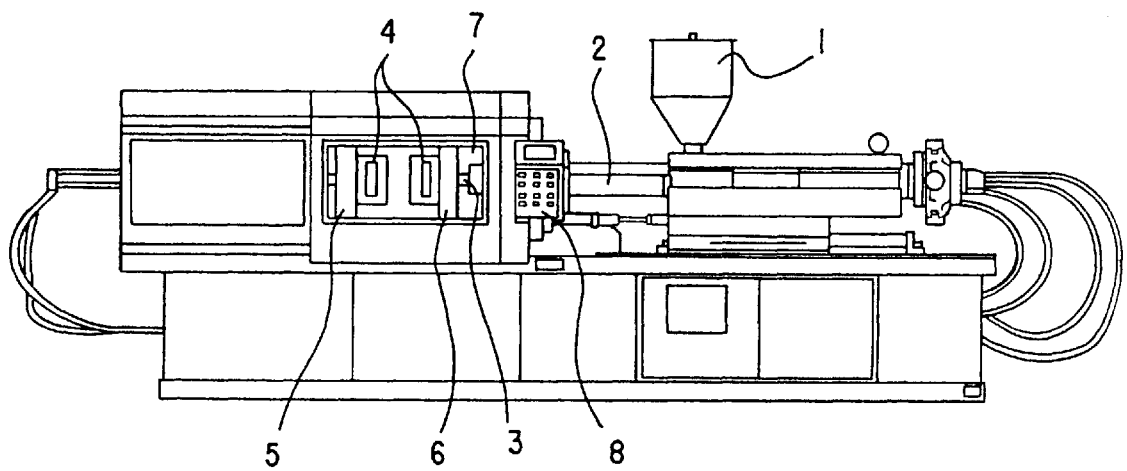
FIG. 1 is a diagram of an injection molding machine.
Figure 2:
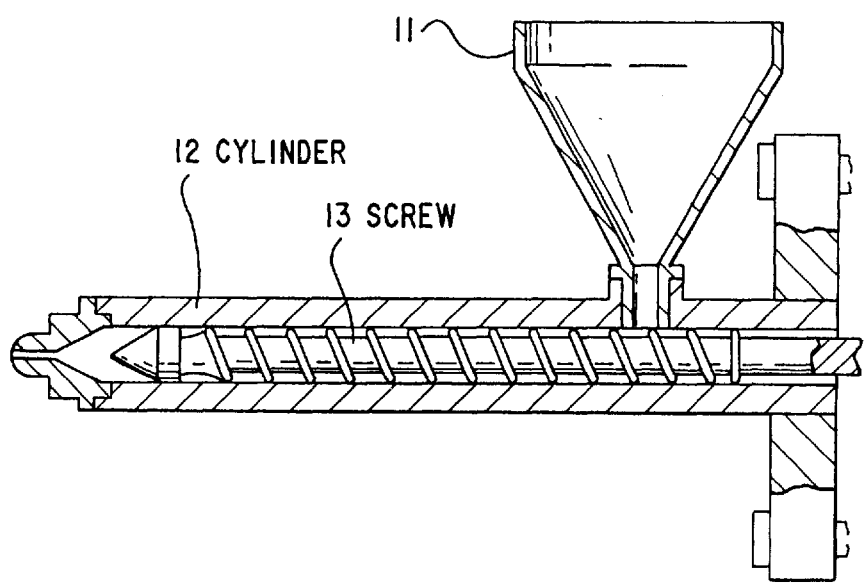
FIG. 2 is a cross section of part of the injection molding apparatus of FIG. 1.

The pellets according to the invention are typically introduced into an injection molding device, as shown in FIG. 1. Specifically, the pellets are fed into a hopper 1, and dropped into a heated cylinder 2. As shown in FIG. 2, the heated cylinder 12, typically contains a screw 13, which transports the resin form the hopper 11 through the cylinder 12. Referring again to FIG. 1, the resin is then injected through a nozzle 3 into a mold, which is typically composed of two mold halves 4 mounted respectively on a movable platen 5 and a stationary platen 6. The resin injection may be controlled by a movable gate 7, or by stopping and starting the screw 13, within the heated cylinder 2. The injection molding machine is typically operated via computerized controls 8. A typical molding cycle begins with the empty mold halves 4 closing. Next, there is a delay, followed by filling the mold with resin either by opening a gate 7 or activating the screw 13. After the mold is filled, it is held at pressure. The pressure is held for a time sufficient to permit the gate to freeze. Then cooling time starts. The cooling time should be long enough to allow the resin to cool to a temperature below the Tg. The plasticizing process starts at the same moment as the cooling time. The cooling time should be a little longer than the plasticizing time to compensate for variability in the plasticizing time, thereby ensuring that the part will not be ruined if the mold is opened prematurely. Lastly, the mold is opened and the part is ejected form the mold.

A nearly infinite variety of plastic parts can be injection molded. One important commercial use for injection molding is the fabrication of optical media or magneto optical media disks such as, for example, DVD disks, CD optical disks, CD-ROM disks, RW optical media disks and the like.

EXAMPLES

The following examples are set forth to provide those of ordinary skill in the art with specific examples of how the compositions of matter and methods claimed herein are made and operated. However, these examples are only intended to be illustrative, and should not be read to limit the scope of the claims.

Example 1

Different pellet sizes were formed by replacing the die heads and adjusting the strand speeds used in the Shear Automatik US 1000 resin pelletizing machine. This machine operates by a somewhat similar mechanism as the machine disclosed in U.S. Pat. No. 4,421,470). Specifically, three optical quality bisphenol-A polycarbonate homopolymer formulations were extruded using the machine. OQ1 and OQ2 were prepared by the interfacial synthesis method, and OQ3 was prepared by the melt synthesis method. OQ1 and OQ2 had a MFR of about 11 (measured at 250° C. and 1.2 kg). OQ3 had an MFR of about 13 (measured at 250° C. and 1.2 kg).

For comparison purposes, the following size pellets were formed:

TABLE I

|     | Length | Height | Width | H/W |
| --- | --- | --- | --- | --- |
| OQ1 | 3.17 | 1.94 | 3.48 | 0.56 |
| OQ2 | 2.94 | 2.31 | 3.04 | 0.76 |
| OQ3 | 3.09 | 2.46 | 2.95 | 0.83 |

OQ1 and OQ2 are not pellets according to the invention because they have height to width (H/W) ratios which are below 0.82. OQ3 has a H/W ratio of 0.83. These three different size pellets were formed by adjusting the rotation speed of the cutting wheel on the pelletizing machine. The data in Table I is based on 11 trials.

Example 2

The pellets formed in Example 1 were fed into a Disc Jet 600 molding machine, which is commercially available from Netstal. The machine was used to mold compact disks. The plasticizing time was measured by the molding machine. The results were as follows:

TABLE II

| | Samples | Mean Plasticizing Time | Standard Deviation |
|---|---|---|---|
| OQ1 | 50 | 1.3812 | 0.1009 |
| OQ2 | 50 | 1.2594 | 0.0587 |
| OQ3 | 50 | 1.1804 | 0.0577 |

Example 3

Figure 4:
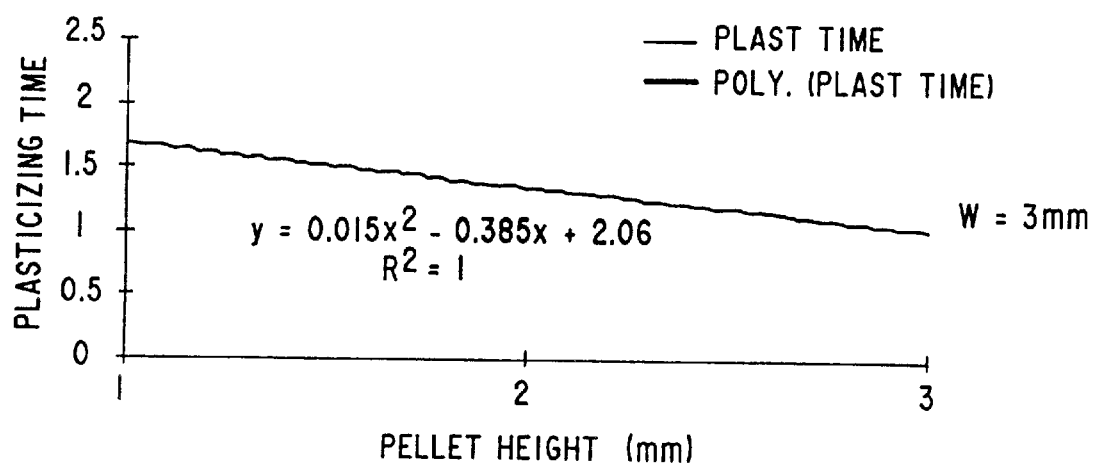
FIG. 4 is a graph showing the relationship between plasticizing time and height.

Next, a number of pellets were produced having different dimensions by the same method as described in Example 1. The length of these pellets was kept constant at 3.0 mm. The plasticizing time target was set at 1.2 seconds. The height of the pellets varied from 1.02 mm to 2.46 mm. The width of the pellets varied from 0.83 mm to 2.05 mm. A transfer function derived from the results is shown in FIG. 4. The results confirmed that plasticizing time is lowest for pellets where the height to width ratio is as close as possible to 1.

What is claimed is:

1. A method for reducing plasticizing time and reducing the variability of said plasticizing time in an injection molding machine which comprises feeding pellets into said molding machine wherein said pellets have an average height to width ratio of between 0.82 and 1.

2. The method according to claim 1, wherein the height to width ratio is greater than 0.9.

3. The method according to claim 1, wherein the injection molding machine has a mold for injection molding optical media.

4. The method according to claim 1, wherein said pellets have a length between 2 and 3.5 mm.

5. The method according to claim 1, wherein said pellets have a length of from 2.7 to 3.3 mm, a width of from 2.9 to 3.5 mm and a height of from 2.3 to 2.9 mm.

6. The method according to claim 1, wherein the pellets comprise a polycarbonate having properties suitable for molding optical information storage media.

* * * * *